Jan. 7, 1969     L. R. JORDAN, JR     3,420,542
VEHICLE STEERING DAMPER
Filed April 6, 1966
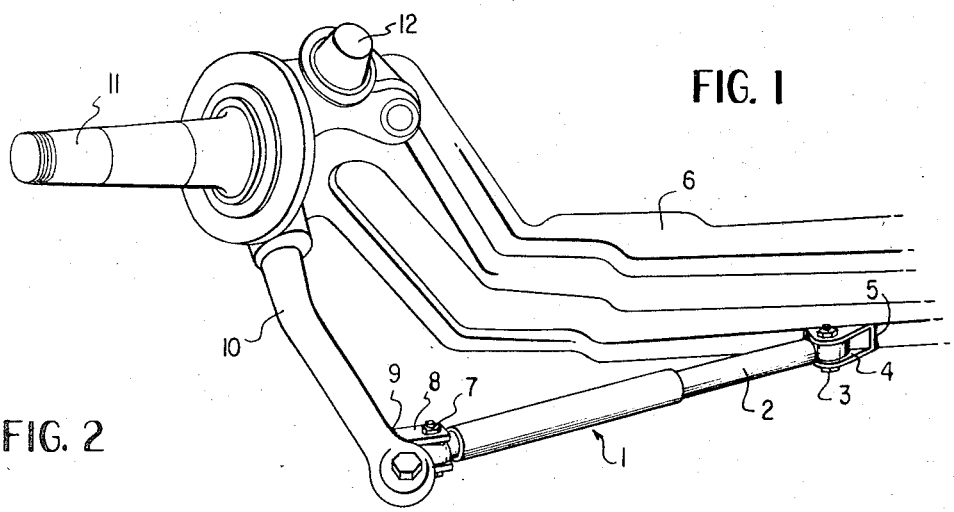
FIG. 1
FIG. 2
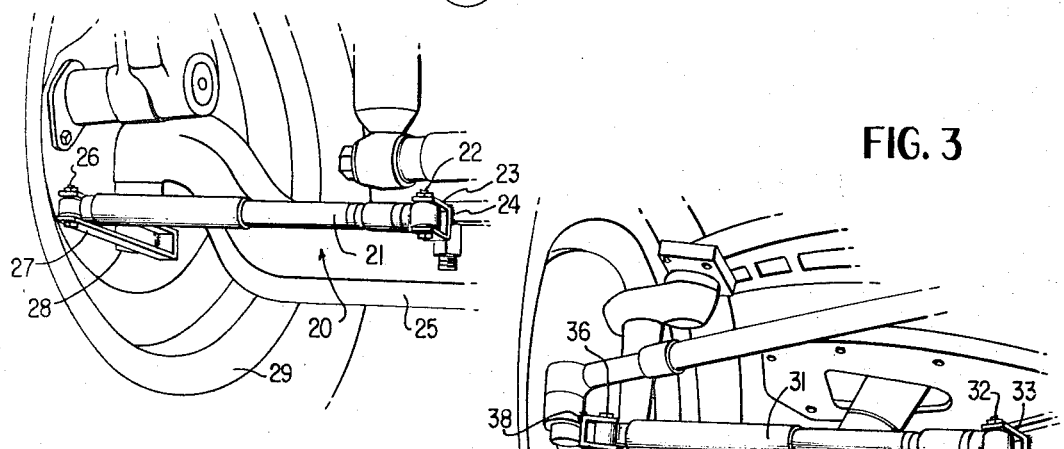
FIG. 3
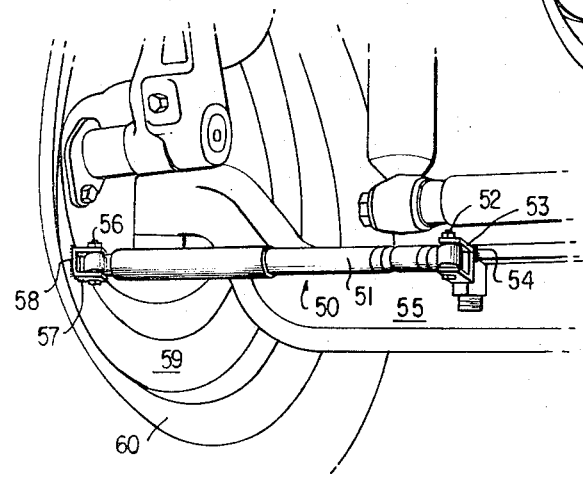
FIG. 4
*INVENTOR.*
LEONARD R. JORDAN, JR.
BY *Dicke + Craig*
ATTORNEYS

United States Patent Office 3,420,542
Patented Jan. 7, 1969

3,420,542
VEHICLE STEERING DAMPER
Leonard R. Jordan, Jr., P.O. Box 427
Toccoa, Ga. 30577
Filed Apr. 6, 1966, Ser. No. 540,548
U.S. Cl. 280—90     10 Claims
Int. Cl. B62d *15/00*

ABSTRACT OF THE DISCLOSURE

A steering damper for dampening and absorbing shocks and vibrations that tend to rotate the wheel of a vehicle about a generally vertical axis, and the method of installing such a damper. More particularly, the present invention relates to a steering damper mounted by welding between a relatively horizontally stationary portion of a vehicle and a portion of the vehicle that would pivot with a wheel of the vehicle about a generally vertical axis, and the method of welding such a steering damper to a vehicle.

Background of the invention

Prior art shock absorbers mounted on a vehicle to absorb and dampen shocks and vibrations of a vehicle wheel about a generally vertical axis have been mounted by means of brackets bolted to the vehicle. In general, these prior are devices have been unsatisfactory and capable of severely limiting the turning radius of a vehicle to produce a dangerous situation.

It has been discovered that prior art steering dampers employing mounting brackets bolted to the vehicle do not present a rigid connection for transmitting all vibrations and shocks and will develop a considerable amount of lost motion in the bolted connection of the bracket due to wear and loosening of the bolts through continued use, so that the steering damper will lose effectiveness. If the bolted connection of the mounting bracket becomes loose enough, the mounting bracket may tend to creep in one direction to shorten the turning radius of the vahicle to one side and result in a dangerous condition. Also, these prior art steering dampers depend on the specific construction of the vehicle on which they are to be mounted; one prior art steering damper employs 43 different types of mounts, as well as right and left hand mounts, to fit a limited number of differently constructed vehicles.

Summary of the invention

The steering damper of the present invention is rigidly mounted on the vehicle by welding so that it will transmit all shocks and vibrations. If the mounting should fail, the steering damper will not alter the turning radius of the vehicle, because the connection will be completely severed. By welding the steering damper to the vehicle, only one steering damper and set of mounts may be used for both the right and left hand sides of vehicles having widely varying constructions.

The steering damper of the present invention will be more economical, because it may be attached to widely varying types of vehicles, thus avoiding a large stock of different parts. The welded mounting is rigid and will directly transmit all shocks and vibrations without lost motion and any failure will be complete so that the mounting will not affect the urning radius of the vahicle.

The steering damper of the present invention employs a steering damper shock absorber welded between the axle or guide member of a wheel and the spindle knuckle, steering arm, tie rod, brake backing plate, or any other portion of the vehicle that will move whenever the wheel is rotated or vibrated about a generally vertical axis.

Brief description of the drawing

Further objects, features, and advantages of the present invention will appear from the following specification in connection with the description of the accompanying drawings, in which:

FIGURE 1 is a perspective view of the steering damper according to the present invention mounted between a vehicle axle and the steering arm of a wheel;

FIGURE 2 is a perspective view of the steering damper according to the present invention mounted between the axle of a vehicle and the spindle knuckle of the associated wheel;

FIGURE 3 is a perspective view of the steering damper according to the present invention showing the mounting of the damper between a wheel guide arm and the steering arm of the wheel; and FIGURE 4 is a perspective view of the steering damper according to the present invention mounted between a vehicle axle and the brake backing plate of the associated wheel.

Detailed description

The drawings show only the vehicle structure that is directly related to the steering damper of the present invention, because the vehicles are otherwise conventional in structure and may be of any type.

In FIGURE 1, the steering damper 1 of the present invention comprises a conventional type steering damper shock absorber 2, having one end pivotally mounted by a bolt 3, to a bracket 4, which is welded at 5 to an axle 6 of a conventional vehicle. The other end of the shock absorber is pivotally mounted by a bolt 7 to a bracket 8, which is welded at 9 to the steering arm 10 of the vehicle. According to the conventional structure of the vehicle, a wheel (not shown) is mounted on the spindle 11; the spindle 11 and steering arm 10 are integral and rotate about the generally vertical axis of the king pin 12, which is suitably mounted on the axle 6. Any vibrations and shocks transmitted from the wheel that tend to vibrate or rotate the spindle about the king pin 12 will be absorbed and dampened by the shock absorber 2. The rigid welded connection of the steering damper will transmit all the shocks and vibrations to the shock absorber without any lost motion that might be obtained from a bolted connection. Also, if the welded connection of either the bracket 8 or the bracket 4 broke, the steering damper would completely separate from the vehicle and not adversely affect the turning radius of the vehicle; thus, there are advantages over a conventional U-bolt type of connection that may slide upon working loose and adversely affect the turning radius of the vehicle.

In FIGURE 2, the steering damper 20 is mounted between the knuckle of the wheel spindle and the axle of the vehicle. One end of the shock absorber 21 is pivotally mounted by a bolt 22 to a bracket 23, which is welded at 24 to an axle 25 of the vehicle. The other end of the shock absorber 21 is pivotally mounted by means of a bolt 26 to an elongated bracket 27, which is welded to the knuckle 28 of the wheel spindle. The elongated bracket 27 forms a crank arm to transmit the shocks and vibrations of the wheel 29 to the shock absorber 21, which will dampen and absorb the vibrations and shocks in a manner similar to the mechanism of FIGURE 1.

In FIGURE 3, the steering damper 30 is mounted between a lower wheel guide member and a wheel steering arm of a vehicle. One end of the shock absorber 31 is pivotally mounted by a bolt 32 to a bracket 33, which is welded at 34 to the lower guide arm 35 of the wheel suspension system. The other end of the shock absorber 31 is pivotally mounted by means of a bolt 36 to a bracket 37, which is welded at 38 to the steering arm 39 of the vehicle wheel 40. Vibrations and shocks received by the steering arm 39 will be directly transferred to the shock absorber 31. The operation of the steering damper 30 is similar to the operation of the steering damper 1, of FIGURE 1.

In the embodiment of FIGURE 4, the steering damper 50 is mounted between a vehicle axle and the brake backing plate of one of the wheels. One end of the shock absorber 51 is pivotally mounted by means of a bolt 52 to a bracket 53, which is welded at 54 to a vehicle axle 55. The other end of the shock absorber 51 is pivotally mounted by a bolt 56 to a bracket 57, which is welded at 58 to the brake backing plate 59 of the wheel 60. The operation of the steering damper of FIGURE 4 is similar to the operation of the previously described steering damper of FIGURES 1-3.

I claim:
1. In a vehicle, a wheel vibration damper mechanism comprising: a vehicle frame; a steerable wheel operatively mounted on said frame for rotation about a generally vertical axis for steering the vehicle; a first vehicle portion operatively connected to said wheel to move relative to said frame in proportion to the movement of said wheel about its generally vertical axis; a first mounting bracket welded to said first vehicle portion to provide a rigid integral fail-safe connection; a second vehicle portion operatively connected to said frame independent of movement of said wheel about its generally vertical axis; a second mounting bracket welded to said second vehicle portion to provided a rigid integral fail-safe connection; a shock absorber having one end pivotally secured to said first mounting bracket and its opposite end pivotally secured to said second mounting bracket; each of said mounting brackets being substantially U-shaped with opposed legs receiving therebetween the respective end of the shock absorber.

2. The device of claim 1, wherein said first vehicle portion is a steering arm operatively connected to said wheel.

3. The device of claim 1, wherein said second vehicle portion is an axle operatively connected to said frame.

4. The device of claim 2, wherein said second vehicle portion is an axle operatively connected to said frame.

5. The device of claim 1, wherein said first vehicle portion is the knuckle of a wheel spindle and said first mounting bracket is elongated to provide an effective crank arm for transmitting the shocks and vibrations of the wheel to the shock absorber.

6. The device of claim 5 wherein said second vehicle portion is an axle operatively connected to said frame.

7. The device of claim 1, wherein said second vehicle portion is a wheel guide member pivotally connected to said frame and pivotally connected to said wheel.

8. The device of claim 7, wherein said first vehicle portion is a steering arm operatively connected to said wheel.

9. The device of claim 1, wherein said first vehicle portion is a brake backing plate operatively connected to said wheel.

10. The device of claim 9, wherein said second vehicle portion is an axle operatively connected to said frame.

References Cited

UNITED STATES PATENTS

| 3,074,515 | 1/1963 | MacLellan | 280—90 |
| 3,333,863 | 8/1967 | Bishop | 280—94 |

FOREIGN PATENTS

| 300,453 | 9/1932 | Italy. |
| 412,186 | 11/1945 | Italy. |
| 458,581 | 5/1950 | Italy. |
| 519,574 | 3/1955 | Italy. |

KENNETH H. BETTS, *Primary Examiner.*

U.S. Cl. X.R.

280—94